United States Patent
Meade et al.

(10) Patent No.: US 12,306,481 B2
(45) Date of Patent: May 20, 2025

(54) DIFFUSION BARRIER LAYER IN LITHIUM NIOBATE-CONTAINING PHOTONIC DEVICES

(71) Applicant: HyperLight Corporation, Cambridge, MA (US)

(72) Inventors: Roy Meade, Bastrop, TX (US); Kevin Luke, Cambridge, MA (US); Mian Zhang, Cambridge, MA (US); Christian Reimer, Wellesley, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/208,818

(22) Filed: Jun. 12, 2023

(65) Prior Publication Data
US 2023/0400716 A1 Dec. 14, 2023

Related U.S. Application Data

(60) Provisional application No. 63/351,723, filed on Jun. 13, 2022.

(51) Int. Cl.
*G02F 1/035* (2006.01)

(52) U.S. Cl.
CPC ................... *G02F 1/035* (2013.01)

(58) Field of Classification Search
CPC ............... G02F 1/035; G02F 2202/20; G02B 2006/1204; G02B 2006/12045
See application file for complete search history.

(56) References Cited

U.S. PATENT DOCUMENTS

| | | | | |
|---|---|---|---|---|
| 5,404,412 A | * | 4/1995 | Seino | G02F 1/0123 385/132 |
| 5,479,552 A | * | 12/1995 | Kitamura | G02F 1/035 385/16 |
| 2003/0091257 A1 | * | 5/2003 | Chakrabarti | G02F 1/035 385/2 |
| 2003/0133637 A1 | * | 7/2003 | Bao | G02B 6/132 385/129 |
| 2005/0199830 A1 | * | 9/2005 | Bowering | G03F 7/70916 250/504 R |
| 2014/0254972 A1 | * | 9/2014 | Fujino | G02F 1/035 385/2 |
| 2015/0001175 A1 | * | 1/2015 | Rabiei | H01J 37/32366 216/24 |

(Continued)

FOREIGN PATENT DOCUMENTS

| | | | | |
|---|---|---|---|---|
| GB | 0178815 | * | 9/1985 | G02B 6/10 |

OTHER PUBLICATIONS

"Ultra-low loss ridge waveguides on lithium niobate via argon ion milling and gas clustered ion beam smoothening" by Siew et al, | Optics Express, vol. 26, No. 4, pp. 4421-4430 (Year: 2018).*

(Continued)

*Primary Examiner* — Robert Tavlykaev
(74) *Attorney, Agent, or Firm* — Van Pelt, Yi & James LLP

(57) ABSTRACT

An electro-optic device is described. The electro-optic device includes a thin film electro-optic layer including lithium and a lithium barrier structure. The thin film electro-optic layer has a plurality of surfaces. The lithium barrier structure covers at least a portion of the plurality of surfaces.

22 Claims, 10 Drawing Sheets

(56) References Cited

U.S. PATENT DOCUMENTS

| | | | |
|---|---|---|---|
| 2021/0359660 A1* | 11/2021 | Tanno | H03H 9/02551 |
| 2021/0364696 A1* | 11/2021 | Reano | G02F 1/035 |
| 2023/0046400 A1* | 2/2023 | Sugiyama | G02F 1/212 |
| 2023/0055077 A1* | 2/2023 | Shi | G02F 1/212 |

OTHER PUBLICATIONS

"Design of high-bandwidth, low-voltage and low-loss hybrid lithium niobate electro-optic modulators" by Weigel et al., J. Phys. Photonics 3, paper 012001, pp. 1-22 (Year: 2021).*

Aubry et al., Poisoning Prevention of TiO2 Photocatalyst Coatings Sputtered on Soda-Lime Glass by Intercalation of SiNx Diffusion Barriers, Science Direct, Surface & Coatings Technology 201, (2007), pp. 7706-7712.

Chan et al., Controlling Diffusion of Lithium in Silicon Nanostructures, Nano Lett. 2010, 10, pp. 821-825.

Kia et al., Spectroscopic Analysis of Ultra-Thin TiN as a Diffusion Barrier for Lithium-Ion Batteries by ToF-SIMS, XPS, and EELS, Applied Surface Science, 564 (2021), 150457, pp. 1-17.

Maeda et al., Diffusion of Li in the Silicon Oxide Films and Evaluation of Li-Induced Surface Potential, Applied Surface Science, 244, (2005), pp. 61-64.

Rahn et al., Li Self-Diffusion in Lithium Niobate Single Crystals at Low Temperatures, Phys. Chem. Chem. Phys., 2012, 14, pp. 2427-2433.

* cited by examiner

DIFFUSION BARRIER LAYER IN LITHIUM NIOBATE-CONTAINING PHOTONIC DEVICES

CROSS REFERENCE TO OTHER APPLICATIONS

This application claims priority to U.S. Provisional Patent Application No. 63/351,723 entitled DIFFUSION BARRIER LAYER IN LITHIUM NIOBATE-CONTAINING PHOTONIC DEVICES filed Jun. 13, 2022 which is incorporated herein by reference for all purposes.

BACKGROUND OF THE INVENTION

Integrated device manufacturers (IDMs) fabricate electro-optic devices. For example, an IDM may perform silicon photonics (SiPh) device design, fabrication, test, and assembly up to and including module assembly. IDMs may also perform heterogeneous integration. For example, III-V laser diode chiplets may be bonded to a SiPh wafer including silicon-on-insulator (SOI) waveguides to provide heterogenous integrated circuits.

Thin film electro-optic (TFEO) materials that incorporate lithium may include thin film lithium niobate (TFLN) and thin film lithium tantalate (TFLT). Such TFEO materials may be desired to be used in optical devices. For example, some lithium-containing TFEO materials have a large modulation in the index of refraction for a given applied electric field, which is desirable. However, integration of lithium-containing TFEO materials may face challenges. Processing of TFLN and/or TFLT may be difficult to scale or result in larger than desired optical and/or microwave losses. Further, if integrated with SiPh devices, lithium contamination and lithium diffusion may adversely affect performance. Thus, the use of lithium-containing TFEO materials may be problematic, particularly for heterogeneous devices such as TFLN-SiPh heterogeneous integrated devices and/or TFLT-SiPh heterogeneous integrated devices. Accordingly, what is desired is a mechanism for incorporating lithium-containing TFEO materials into photonics devices, particularly into heterogeneous integrated circuits.

BRIEF DESCRIPTION OF THE DRAWINGS

Various embodiments of the invention are disclosed in the following detailed description and the accompanying drawings.

DETAILED DESCRIPTION

Figure 1A:
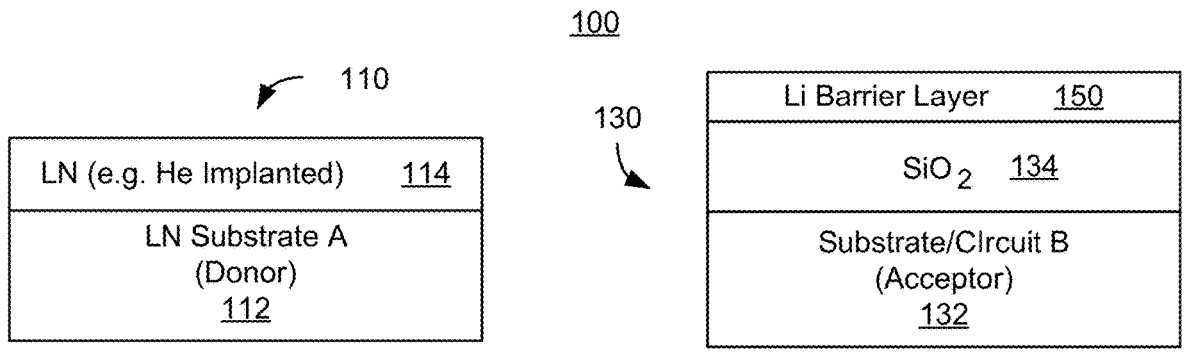
FIGS. 1A-1E are diagrams depicting an embodiment of an electro-optic device during fabrication.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Integrated device manufacturers (IDMs) fabricate electro-optic devices. For example, an IDM may perform silicon photonics (SiPh) device design, fabrication, test, and assembly up to and including module assembly. IDMs may also perform heterogenous integration. For example, IDM wafer fabs may support Chip on Wafer (CoW) for III-V integration with SiPh devices. Some IDM III-V integration schemes use blanket chiplets bonded to an acceptor wafer. Such chiplets are unpatterned in-plane but may be patterned perpendicular-to-plane. The acceptor wafer may have SiPh structures (e.g. a silicon-on-insulator waveguide) fabricated therein. Thus, III-V laser diode chiplets bonded on a SiPh wafer including silicon-on-insulator (SOI) waveguides provide heterogenous integrated circuits.

Thin film electro-optic (TFEO) materials that contain lithium include thin film lithium niobate (TFLN) and thin film lithium tantalate (TFLT). TFEO layer may have a thickness not exceeding ten micrometers. In some embodiments, the TFEO layer has a thickness of not more than one micrometer. In some embodiments, the thickness of the TFEO layer may be not more than seven hundred nanometers. In some such embodiments, the thickness may be not more than four hundred nanometers. Other thicknesses are possible. Such lithium-containing TFEO materials may be desired to be used in optical devices. For example, some TFLN and/or TFLT have a large modulation in the index of refraction for a given electric field. Thus, such materials are desirable for use in photonics devices such as optical modulators.

Integration of lithium-containing TFEO such as TFLN and/or TFLT may face challenges. Processing of TFLN and/or TFLT may be difficult to scale or result in larger than desired optical losses and/or microwave losses. For integration with SiPh devices, lithium contamination may be an issue. Lithium diffusion may also be problematic. Lithium readily diffuses in Si and $SiO_2$ among other mediums. Lithium is considered an alkali contamination, which are known to shift the threshold voltage of CMOS transistors. Thus, Li diffusion could adversely affect the functioning of the circuit with which the TFLN is combined or circuits fabrication on other wafers fabricated using the same equipment. Lithium is also known to diffuse within lithium niobate. Diffusion of lithium within lithium niobate could alter the materials properties. Thus, the use of lithium-containing electro-optic materials in electro-optic devices may be difficult to achieve, particularly for heterogeneous devices such as TFLN-SiPh heterogeneous integrated devices and/or TFLT-SiPh heterogeneous integrated devices.

An electro-optic device is described. The electro-optic device includes a thin film electro-optic layer including lithium and a lithium barrier structure. The thin film electro-optic layer has a plurality of surfaces. The lithium barrier structure covers at least a portion of the plurality of surfaces. In some embodiments, the lithium barrier structure includes at least one of a silicon nitride layer, a silicon oxynitride layer, a titanium nitride layer, or a tantalum nitride layer. The lithium barrier structure may include a lithium barrier underlayer. In such embodiments, the thin film electro-optic layer is on the lithium barrier underlayer. In some embodiments, the surfaces of the electro-optic layer include a top surface, which is covered by the lithium barrier structure.

The thin film electro-optic layer may include patterned structures, each of which has a bottom surface, a top surface, and sidewalls. The lithium barrier structure covers at least one of the bottom surface, the top surface, or the plurality of sidewalls.

In some embodiments, the thin film electro-optic layer and the lithium barrier structure are part of an integrated circuit. In such embodiments, the electro-optic device further includes a photonics device coupled with the integrated circuit. The photonics device may be a silicon photonics device. The integrated circuit may be bonded to the photonics device such that at least a portion of the lithium barrier structure is between a portion of the photonics device and the thin film electro-optic layer. A lithium barrier layer may cover one or more sides of the integrated circuit. In some embodiments, the electro-optic device also includes an insulating dielectric layer. The thin film electro-optic layer is between the insulating dielectric layer and the lithium barrier structure.

An electro-optic device is described. The electro-optic device includes a waveguide, a lithium barrier structure and electrodes. The waveguide has a thin film electro-optic layer. The thin film electro-optic layer includes lithium and has multiple surfaces. The lithium barrier structure covers at least a portion of the surfaces of the thin film electro-optic layer. The electrodes are in proximity to a portion of the waveguide. In some embodiments, a silicon photonics device including a silicon waveguide optically coupled with the waveguide.

A method is described. The method includes providing a thin film electro-optic layer including lithium and having a plurality of surfaces. The method also includes providing a lithium barrier structure covering at least a portion of the plurality of surfaces. Providing the lithium barrier structure may include depositing at least one of a silicon nitride layer, a silicon oxynitride layer, a titanium nitride layer, or a tantalum nitride layer.

In some embodiments, providing the thin film electro-optic layer further includes providing an electro-optic layer. The electro-optic may be patterned layer to provide patterned structures. The thin film electro-optic layer may include patterned structures, each of which has a bottom surface, a top surface, and a plurality of sidewalls. In some embodiments. providing the lithium barrier structure further includes depositing a first lithium barrier layer before the thin film electro-optic layer is provided and depositing a second lithium barrier layer after the plurality of patterned structures is provided. The second lithium barrier layer covers the top surface and the sidewalls of each of the patterned structures. A portion of the first lithium barrier layer is adjacent to the bottom surface of each of the patterned structures.

In some embodiments, the thin film electro-optic layer and the lithium barrier structure are part of an integrated circuit. In such embodiments, the method also includes bonding the integrated circuit to a photonics device such that at least a portion of the lithium barrier structure is between the thin film electro-optic layer and the photonics device. In some embodiments, the photonics device is one of a plurality of photonics devices integrated into a wafer and the integrated circuit is one of a plurality of integrated circuits. Each of the plurality of integrated circuits includes the thin film electro-optic layer and the lithium barrier structure. In such embodiments, the bonding further includes bonding remaining integrated circuits to remaining devices and singulating a plurality of heterogeneous integrated circuits. Each of the heterogeneous integrated circuits includes a particular photonics device and a particular integrated circuit. In some embodiments the photonics device is a silicon photonics device. Providing the thin film electro-optic layer may further include providing the thin film electro-optic layer on an insulating dielectric layer. Thus, the thin film electro-optic layer is between the insulating dielectric layer and the lithium barrier structure.

FIGS. 1A-1E are diagrams depicting an embodiment of electro-optic device 100 during fabrication. For simplicity, not all components are shown and those portions that are shown are not to scale. In the embodiment shown, a donor circuit A 110 and an acceptor circuit B 120 are utilized. Donor circuit A 110 includes a donor substrate 112 and a lithium-containing thin film electro-optic (TFEO) material 114. Donor substrate A 112, or wafer, has thereon a thin film electro-optic layer 114 that includes Li. In the embodiment shown, lithium-containing TFEO layer 114 is a TFLN layer, which may be implanted with He. Consequently, FIGS. 1A-1E are described in the context of a TFLN layer 114. Li-containing TFEO layer 114 may include other and/or additional electro-optic layers that include Li in other embodiments. For example, LT may be used in lieu of or in addition to LN.

Acceptor circuit B 130 includes an acceptor substrate B 132, an oxide layer 134, and a Li barrier structure 150. Acceptor substrate B 132, or wafer, may be a Si wafer having $SiO_2$ (or other appropriate oxide) layer 132. Because of its position in the final integrated circuit, oxide layer 134 may be considered a buried oxide (BOX) layer. In some embodiments, structures, such as silicon waveguides or other silicon photonics structures and/or CMOS components, may be formed in or on substrate 132. Thus, acceptor substrate B 132 may also be considered to be an acceptor circuit. In other embodiments, acceptor substrate B 132 may be a blank substrate.

Also shown on the acceptor circuit B 130 is Li barrier structure 150. In the embodiment shown, barrier structure 150 is a barrier layer and will be termed a barrier layer for device 100. However, nothing prevents barrier layer 150 from having structures including but not limited to trenches, apertures, a multilayer structure, or other structures. Further, although depicted as flat, barrier layer 150 may have another structure, for example due to underlying topology of acceptor circuit B 130. In some embodiments, Li barrier layer 150 is on TFLN layer 114 of donor circuit A 110. Barrier layer 150 substantially retards and/or prevents the diffusion of lithium through barrier layer 150. Further, barrier layer 150 is sufficiently thin that performance of photonics device 100 being formed is not adversely affected. For example, barrier layer 150 may include one or more of titanium nitride (e.g. at least ten nanometers of TiN that may be formed via atomic layer deposition (ALD)), silicon nitride (e.g. at least 90-100 nanometers or more of SiN that may be formed via PECVD or LPCVD and may be densified by an anneal at anneal temperature(s) of at least 800 degrees Celsius), tantalum nitride (e.g. at least ten nanometers of TiN that may be formed via atomic layer deposition (ALD)), and/or silicon oxynitride (which can have its index of refraction tuned by tuning the nitrogen content). In some embodiments, barrier layer 150 is sufficiently thick to significantly reduce or prevent the formation of pinholes in barrier layer 150. For example, barrier layer 150 may be at least two monolayers (e.g. at least three through ten nanometers) thick. For thicknesses less than those described above (including less than two monolayers), diffusion of Li may be significantly reduced, but not eliminated. However, layer 150 is still termed a barrier layer. In some embodiments, barrier layer 150 is not more than two hundred nanometers thick. In some embodiments, silicon nitride and silicon oxynitride may be used because TaN and TiN are conductive. Consequently, TaN and TiN may be used as or in barrier layers 150 far from structures such as waveguides to reduce eddy currents. In some embodiments, barrier layer 150 is desired to have an index of refraction that differs significantly from the TFLN (or other Li-containing electro-optic material) 114 index of refraction. This difference in index of refraction is desired to reduce or prevent the optical mode from being pulled from the TFLN (or other Li-containing electro-optic material) 114 into barrier layer 150. Barrier layer 150 of FIG. 1A may function as bonding layer in addition to being a barrier layer. In some embodiments, barrier layer 150 is deposited on the $SiO_2$ layer. In some embodiments, barrier layer 150 is grown on $SiO_2$ layer 134 (e.g. via nitridization of the $SiO_2$ layer).

Figure 1B:
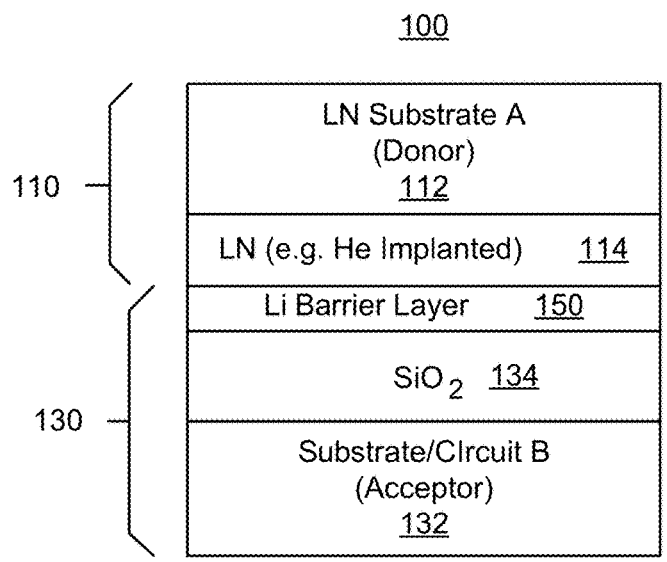
Figure 1C:
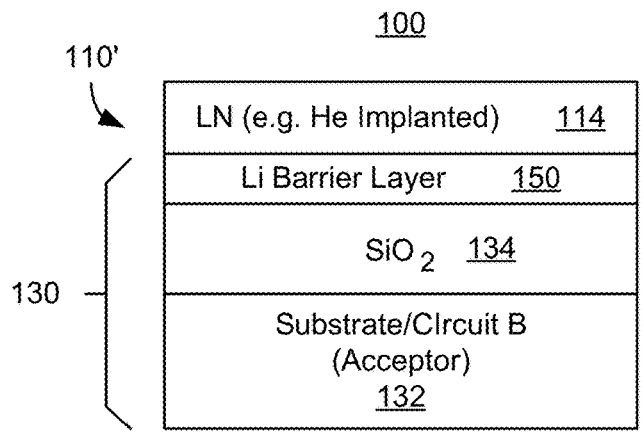

In FIG. 1B, that donor circuit A 110 has been flipped and bonded with acceptor circuit B 130. Thus, as indicated above, barrier layer 150 also aids in bonding between acceptor and donor circuits 110 and 130. Although shown as the same size in FIG. 1B, nothing prevents the donor circuit A 110 and/or acceptor circuit B 130 from having different sizes. For example, donor circuit A 110 may be a chiplet, while acceptor circuit B 130 may be one of many circuits on an acceptor wafer (e.g. a SiPh wafer) 132. In FIG. 1C, donor substrate 112 has been removed. In some embodiments, the donor substrate 112 may not be completely removed. Thus, in some embodiments, an integrated TFLN photonics device 100 has been formed at FIG. 1C. In other embodiments, device 100 shown in FIG. 1C may undergo further processing.

Figure 1D:
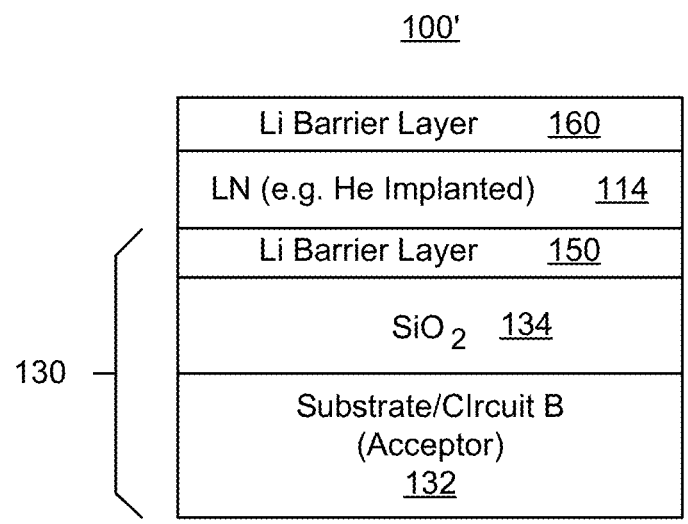
Figure 1E:
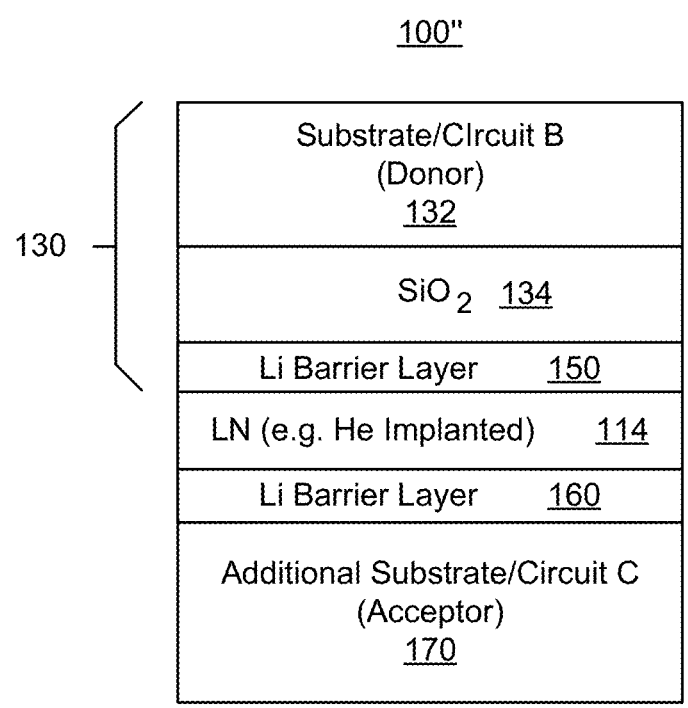

For example, FIG. 1D depicts device 100' after additional barrier layer 160 has been formed on TFLN layer 114. Barrier layer 160 is analogous to barrier layer 150. Thus, barrier layer 160 retards or prevents the diffusion of lithium. Further, barrier layer 160 may have structures (e.g. trenches, apertures, a multilayer structure, or other structures) formed therein. Barrier layer 160 may also act as a bonding layer if device 100' shown in FIG. 1D is to be bonded to another substrate. Thus, a barrier structure including barrier layers 150 and 160 is present in device 100'. In some embodiments, an integrated TFLN photonics device 100' has been formed if bonding has been completed at FIG. 1D. In other embodiments, device 100' shown in FIG. 1D may undergo further processing. FIG. 1E depicts electro-optic device 100" after the device 100' shown in FIG. 1D has been flipped and bonded to another circuit or substrate C 170. The substrate B 170 (previously functioning as an acceptor substrate) has become a donor substrate. Substrate C 170 may include components that are fabricated therein. In some embodiments, substrate C 170 may include an oxide layer analogous to the $SiO_2$/BOX layer shown in FIGS. 1A-1D. Because of the barrier structure including barrier layers 150 and 160, Li diffusion into substrate 132 and 170 may be mitigated or prevented. Thus, heterogeneous photonics device 100" having structures formed on both sides of TFLN layer 114 may be formed.

Thus, heterogeneous integrated photonics device(s) 100, 100', and/or 100" have been formed. The device(s) include a Li barrier structure that may be formed from barrier layer 150 (FIG. 1C) or multiple barrier layers 150 and 160 (FIG. 1D and/or FIG. 1E). Because of the use of the barrier structure, performance and reliability of the heterogeneous integrated photonics device(s) 100, 100', and/or 100" may be improved. For example, the diffusion of Li in the TFLN 114 layer into the $SiO_2$ layer 134 and/or into the substrate B 132 (and components thereof) and additional substrate C 170 (and components thereof) may be reduced or eliminated. Consequently, any devices formed using substrate B 132 and/or substrate C 170 may not be adversely affected by Li diffusion. Further, Li contamination in a manufacturing facility due to TFLN layer 114 may be reduced or eliminated. In addition, the performance of components of the electro-optic device formed using TFLN layer 114 may be improved.

Figure 2:
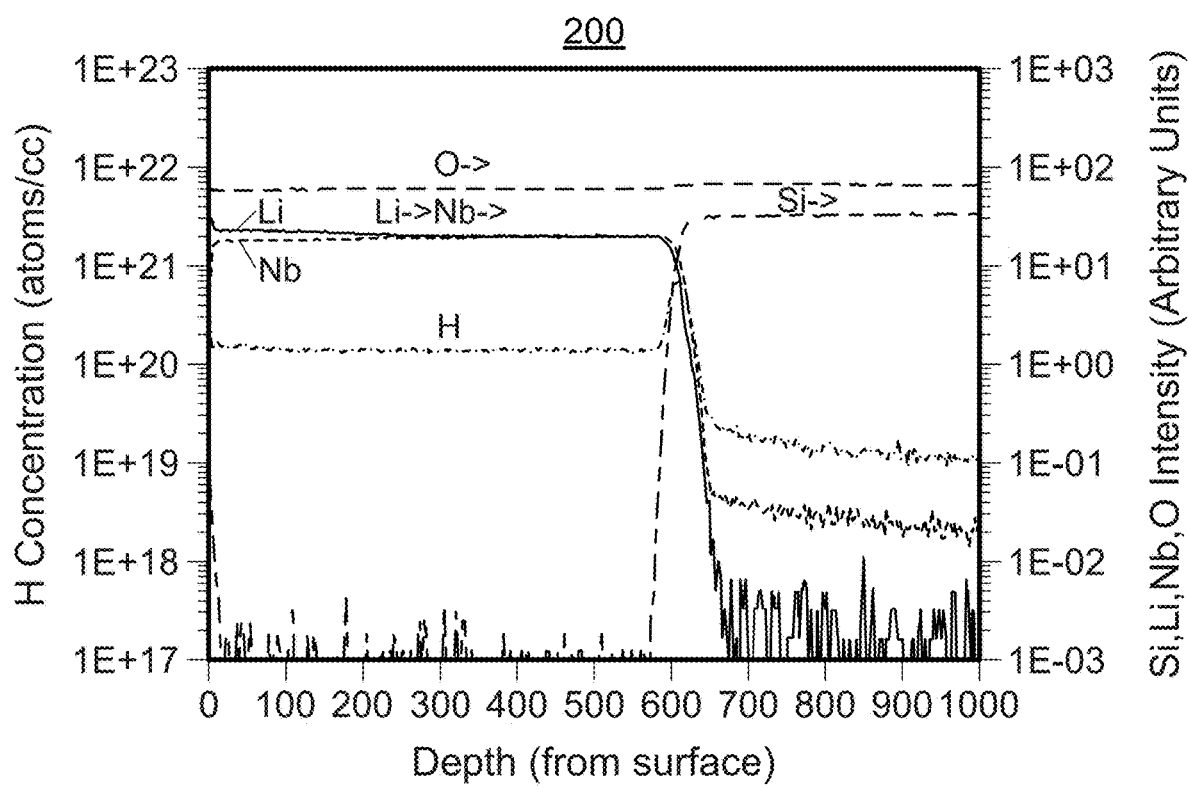
FIG. 2 depicts the concentration of constituents of an H-implanted TFLN layer as a function of distance from the surface.

FIG. 2 is a graph 200 depicts the concentration of constituents of an H-implanted TFLN layer as a function of distance from the surface (i.e. depth). Graph 200 is described in the context of photonics device 100. However, a similar discussion applies to analogous devices including lithium-containing TFEO layers, including but not limited to photonics devices 100' and/or 100". The TFLN layer 114 concentration of Li and Nb differ near an exposed surface (e.g. the top of TFLN layer 114 in FIG. 1A). This is due to the diffusion of Li within TFLN layer 114. Use of barrier layers 150 and 160 on both sides of TFLN layer 114 (as in FIG. 1D and FIG. 1E) may reduce or eliminate the diffusion. Further, the stoichiometry of TFLN layer 114 may be compensated for prior to deposition of barrier layer 150 on top of TFLN layer 114 (if formed on TFLN layer 114 instead of as part of circuit 130). For example, TFLN layer 114 might be implanted or placed in a Li bath, then barrier layer 150 applied. Thus, the stoichiometry of TFLN layer 114 near its surfaces may not significantly vary from the stoichiometry deeper in the film. Consequently, the expected and desired optical performance may be more readily achieved.

FIGS. 3A-3D are diagrams depicting another embodiment of electro-optic device 300 during fabrication. For simplicity, not all components are shown and those portions that are shown are not to scale. In the embodiment shown, donor circuit 310 and an acceptor circuit 330 are utilized. Donor circuit 310 includes a donor substrate 312 and lithium-containing TFEO material 314, which is depicted as a layer. Acceptor circuit 330 includes acceptor substrate 332 and oxide layer 334. TFEO layer 314 is on donor substrate, or wafer, 312. In the embodiment shown, TFEO layer 314 is a TFLN layer, which may be implanted with He. Other electro-optic layers that include Li might be used in other embodiments. For example, LT may also be used. Donor circuit A 310 and acceptor circuit B 330 are analogous to donor circuit 110 and acceptor circuit 130 of in FIG. 1A except that neither the donor circuit A nor the acceptor circuit B includes a barrier structure analogous to barrier structure 150.

Acceptor substrate B 332, or wafer, may be a Si wafer on which an $SiO_2$ (or other appropriate oxide such as borophosilicate glass) layer 334 is provided. Because of its position in the final integrated circuit, oxide layer 334 may be considered a BOX layer. In some embodiments, structures, such as silicon waveguides or other silicon photonics structures and/or CMOS components, may be formed in acceptor substrate 332. In other embodiments, the acceptor substrate 332 may be a blank substrate.

Figure 3A:
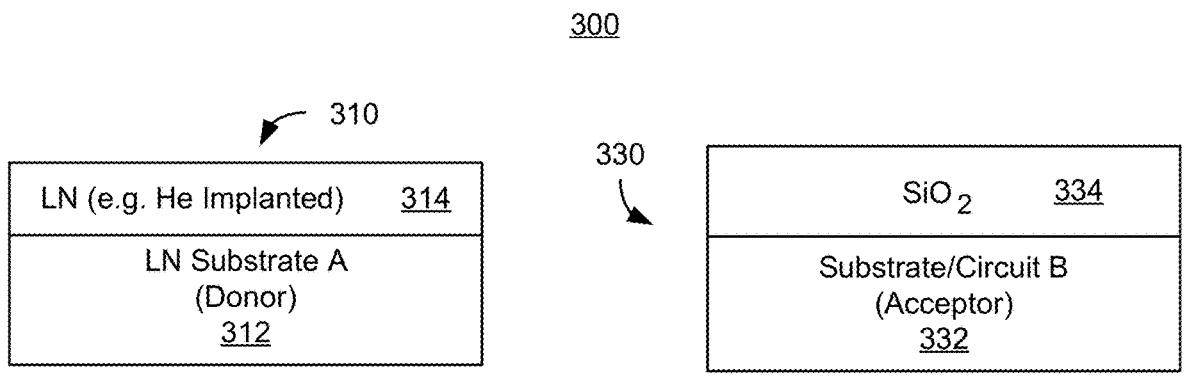
FIGS. 3A-3D are diagrams depicting an embodiment of an electro-optic device during fabrication.
Figure 3B:
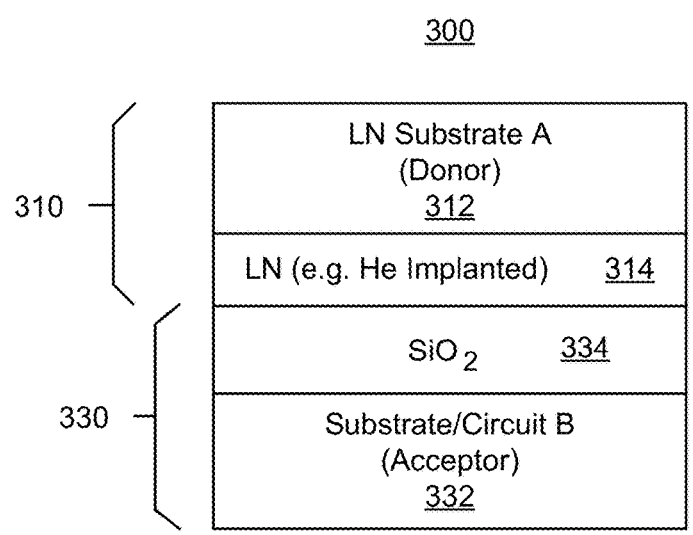

FIG. 3B indicates that donor circuit 310 A has been flipped and bonded with acceptor circuit B 330. Although shown as the same size in FIG. 3B, nothing prevents the donor and acceptor circuits 310 and 330 from having different sizes. For example, donor circuit 310 may be a chiplet, while the acceptor circuit 330 may be one of many circuits on an acceptor wafer (e.g. a SiPh wafer). However, because barrier layer 150 used in FIGS. 1-1E has been omitted, the BOX layer (e.g. $SiO_2$) 334 may be desired to be thicker to prevent Li diffusion into substrate B 332.

Figure 3C:
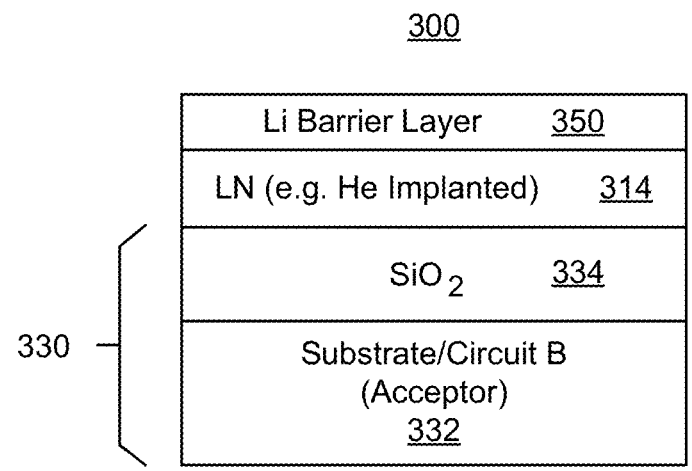
Figure 3D:
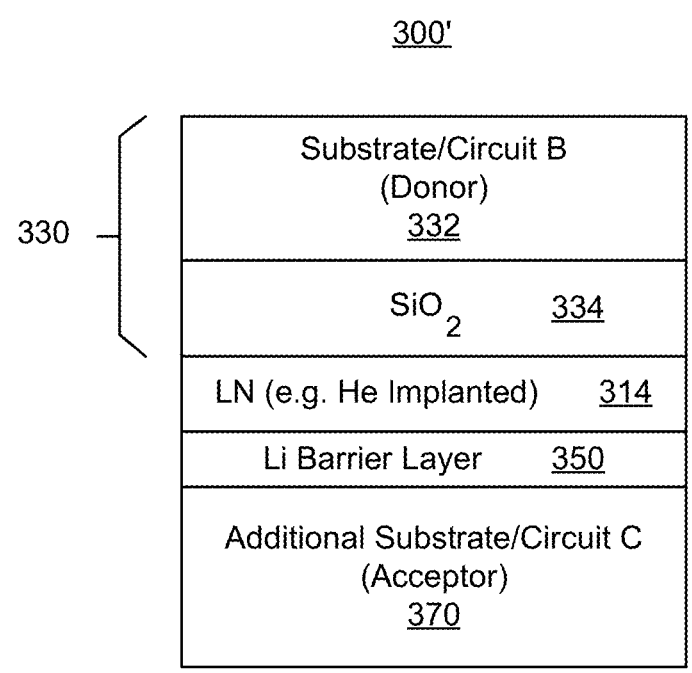

FIG. 3C indicates that donor substrate 312 has been removed. Barrier structure 350 has also been provided. Barrier structure 350 is depicted and described herein as a layer. However, barrier structure 350 may include structures fabricated therein (e.g. trenches, apertures, a multilayer structure, or other structures). In some embodiments, barrier layer 350 shown in FIG. 3C is analogous to barrier layer 150 and/or 160 shown in FIGS. 1A-1E. Barrier layer 350 of FIG. 3C may function as bonding layer in addition to being a barrier layer. In some embodiments, an integrated TFLN photonics device 300 has been formed. In other embodiments, the circuit 300 shown in FIG. 3C may undergo further processing. For example, FIG. 3D depicts the electro-optic device 300' after device 300 shown in FIG. 3C has been flipped and bonded to another circuit or substrate C 370. Substrate B 332 has become a donor substrate. Substrate C 370 may be analogous to substrate 170. Thus, substrate C 370 may include components that are fabricated therein. In some embodiments, substrate C 370 may include an oxide layer analogous to the $SiO_2$/BOX layer shown in FIGS. 1A-1E.

Thus, heterogeneous integrated photonics circuit(s) 300 and/or 300' have been formed. The circuit(s) include barrier structure 350 that may be formed as a barrier layer 350 (FIG. 3C and/or FIG. 3D). Because of the use of barrier structure 350, performance and reliability of the heterogeneous integrated photonics device(s) 300 and/or 300' may be improved. In particular, benefits analogous to those described for the photonics devices 100, 100', and/or 100" of FIGS. 1A-1E may be realized. For example, Li contamination in a manufacturing facility due to TFLN layer 314 may be reduced or eliminated. Further, the stoichiometry of TFLN layer 314 may be closer to what is desired. Thus, the optical properties of TFLN layer 314 may be preserved and performance of components of the electro-optic device(s) 300 and/or 300' formed using TFLN layer 314 may be improved.

Figure 4:
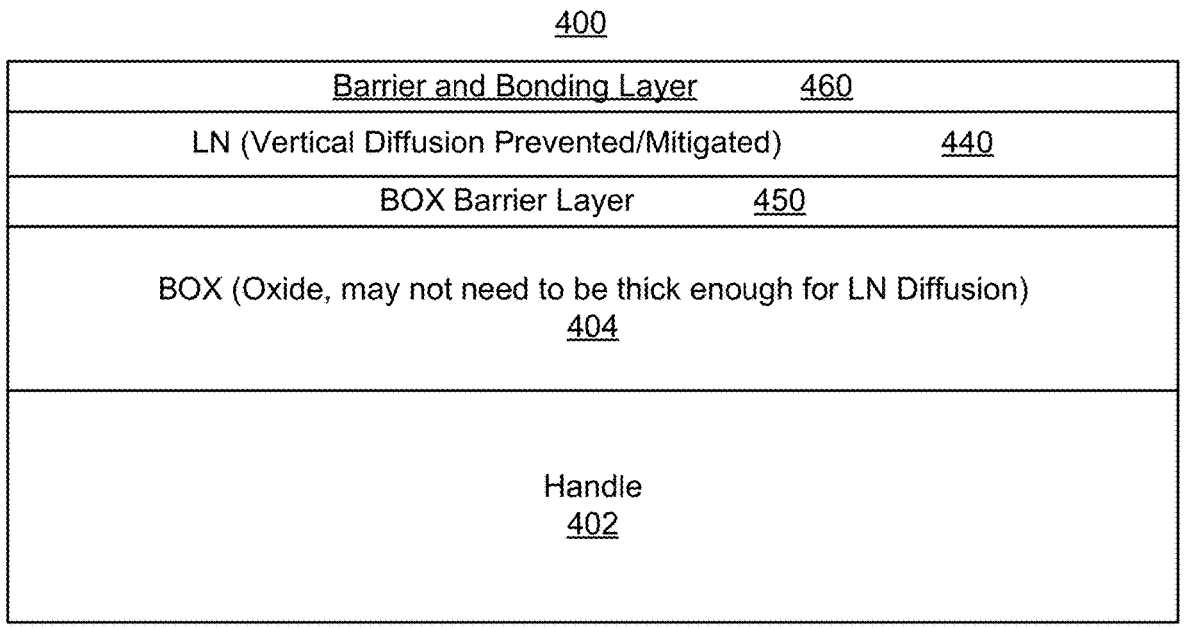
FIG. 4 depicts an embodiment of a TFLN on insulator circuit.

FIG. 4 depicts another embodiment of electro-optic device 400 including a lithium-containing TFEO material on an insulator. More specifically, electro-optic device 400 is a TFLN on insulator (TFLNOI) circuit. In some embodiments, TFLNOI circuit 400 shown in FIG. 4 undergoes further processing to form a final device. TFLNOI circuit 400 includes handle wafer 402, BOX layer 404, BOX barrier layer 450, TFLN layer 440, and barrier and bonding layer 460. Handle wafer 402 may be a silicon wafer. In some embodiments, structures are formed in handle wafer 402. In other embodiments, handle wafer 402 may not have structures formed therein. In some embodiments, BOX barrier layer 450 and barrier and bonding layer 460 are each Li barrier layers such as those described herein (e.g. barrier layers 150, 160, and 350. For example, layers 450 and 460 may include or consist of TaN, TiN, SiN, SiOxN (silicon oxynitride) of the desired stoichiometry and thickness. Thus, the barrier structure for TFLNOI circuit 400 4 may include both BOX barrier layer 450 and barrier and bonding layer 460. In some embodiments, BOX barrier layer 450 and/or barrier and bonding layer 460 are desired to be insulating. Thus, Li barrier layers 450 and 460 of FIG. 4 may be SiN and/or SiOxN.

In some embodiments, BOX barrier layer 450 is deposited. For example, SiN may be deposited and, in some cases, densified. In some embodiments, box barrier layer 450 may be formed by nitridizing a silicon dioxide BOX layer. When forming BOX barrier layer 450, high temperature anneals and/or other processes that may adversely affect TFLN layer 440 may be used. This is because TFLN layer 440 has not yet been provided. In some embodiments, BOX barrier layer 450 is desired to be thin. A thinner BOX barrier layer 450 may be desired because the indexes of refraction are similar for TFLN and SiN and/or some stoichiometries of SiOxN. In some embodiments, a thin layer of oxide such as $SiO_2$ (not shown in FIG. 4), is provided on top of BOX barrier layer 450 for improved bonding to TFLN layer 440.

After formation of BOX barrier layer 450, TFLN layer 440 may be provided. TFLN layer 440 may be bonded to BOX barrier layer 450 in a manner analogous to that described with respect to FIGS. 1A-1E. Barrier and bonding layer 460 may then be provided. Barrier and bonding layer 460 may be deposited on TFLN layer 440. In some embodiments, TFLN layer 440 may be doped prior to deposition of barrier and bonding layer 450 to improve the stoichiometry of the TFLN after encapsulation by barrier and bonding layer 460. In addition, a charge bleed layer (not shown in FIG. 4) may be provided prior to encapsulation.

TFLNOI circuit 400 of FIG. 4 may share the benefits of the heterogeneous circuits described with respect to FIGS. 1A-1E and FIGS. 3A-3D. Vertical out-diffusion of Li may be reduced or prevented from both top and bottom surface of TFLN layer 440. In some embodiments, TFLN layer 440 may be further processed. For example, TFLN layer 440 may be etched to form waveguides before and/or after barrier and bonding layer 460 is provided.

Thus, TFLNOI circuit 400 has been formed. The Li barrier structure is formed by BOX barrier layer 450 and barrier and bonding layer 460. Because of the use of the Li barrier structure, performance and reliability of a heterogeneous integrated photonics device utilizing TFLNOI circuit 400 of FIG. 4 may be improved. Li diffusion into other components (e.g. those above or below the Li barrier layers 450 and 460) may be reduced or eliminated. Li contamination in a manufacturing facility due to TFLN layer 440 may be reduced or eliminated. Further, the stoichiometry of TFLN layer 440 may be closer to what is desired. Thus, the optical properties of TFLN layer 440 may be preserved and performance of components of the electro-optic device formed using TFLN 440 layer may be improved.

Figure 5A:
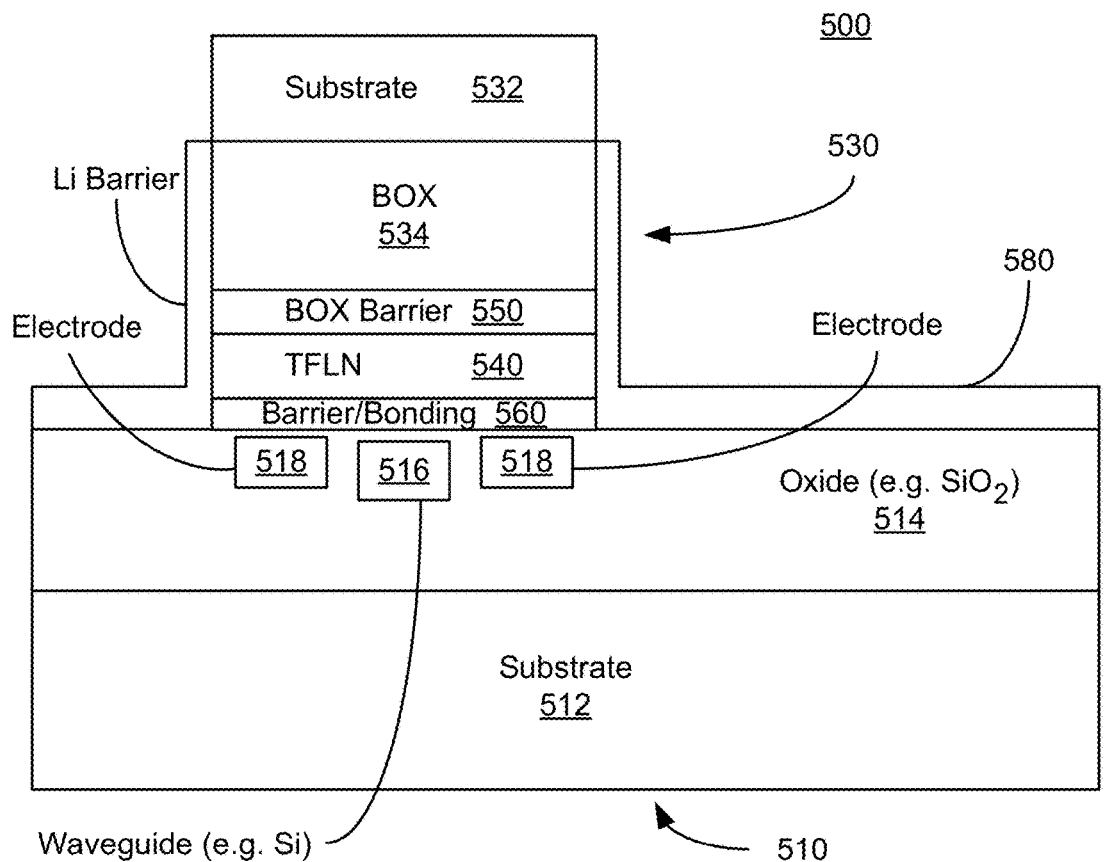
FIGS. 5A-5B depict embodiments of heterogeneous integrated devices that include electro-optic layers having Li.
Figure 5B:
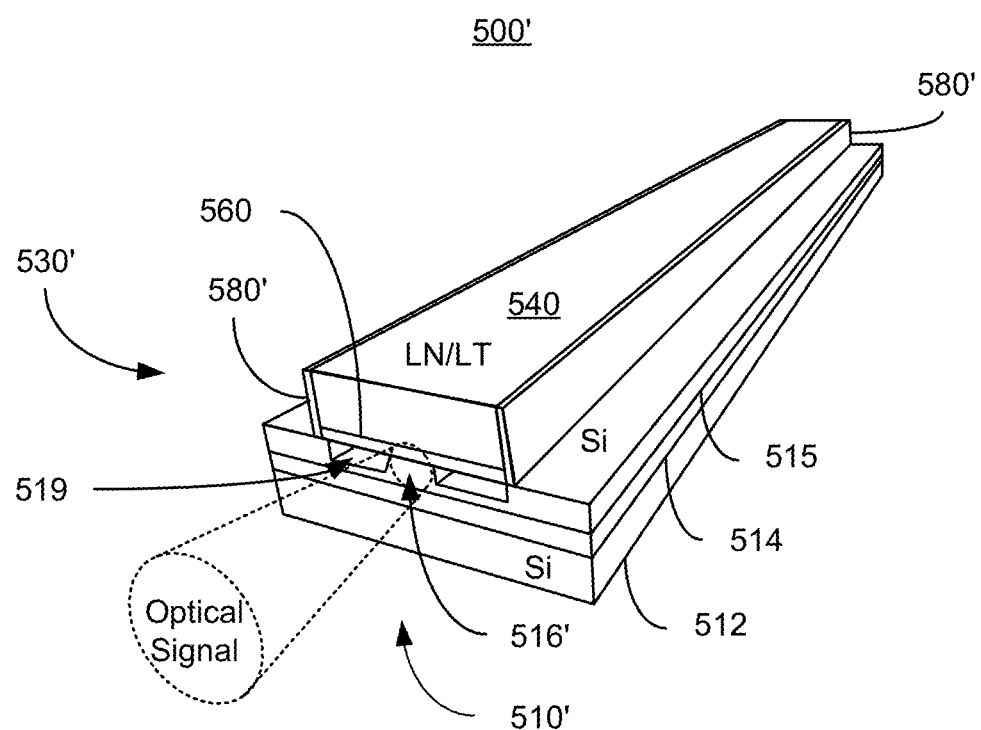

FIGS. 5A-5B depict embodiments of heterogeneous integrated devices 500 and 500' that include electro-optic layers having Li. In the embodiments shown, the electro-optic devices 500 and 500' include lithium-containing TFEO layers 540. In some embodiments, TFLN is used for layer 540. In other embodiments, another Li-containing electro-optic material such as LT may be used. Thus, the lithium-containing TFEO layer 540 is described as LN/LT or TFLN layer 540. Heterogeneous integrated electro-optic device 500 of FIG. 5A includes TFLN chiplet 530 (i.e. a chiplet including TFLN electro-optic layer 540) and a SiPh integrated circuit 510. SiPh chip 510 is an SOI integrated circuit that includes silicon substrate 512 and oxide layer 512, such as SiO$_2$. In the embodiment shown, SiPh integrated circuit 510 also includes silicon waveguide 516 and electrodes 518. In some embodiments, the confinement of Si waveguide 516 may be tailored. For example, waveguide 516 may be made smaller so that the mode expands. This may aid in coupling with TFLN layer 550 of TFLN chiplet 530. However, waveguide 516 may still be still sufficiently large that the mode does not extend to electrodes 518. In other embodiments, additional and/or other components may be included.

TFLN chiplet 530 includes barrier/bonding layer 560, TFLN layer 540, BOX barrier layer 550, BOX layer 534, and substrate 532 that are analogous to barrier and bonding layer 460, TFLN layer 440, BOX barrier layer 450, BOX layer 404, and/or substrate 402 depicted in FIG. 4. Thus, TFLN chiplet 530 shown in FIG. 5A may be singulated from a wafer 512 analogous to that shown in FIG. 4. In the embodiment shown, TFLN chiplet 530 as unpatterned TFLN layer 540. In other embodiments, TFLN layer 540 may be patterned and/or other components may be included. In some embodiments, silicon oxynitride may be utilized for barrier/bonding layer 560 and/or BOX barrier layer 550. Use of silicon oxynitride allows for tailoring of the indexes of refraction of barrier/bonding and BOX barrier layers 560 and 550. Consequently, a larger difference in the indexes of refraction between TFLN layer 540 and the barrier layers 560 and 550 may be achieved. In other embodiments, SiN and/or other Li barriers may be used in addition to or in lieu of silicon oxynitride. In some embodiments, a somewhat thinner barrier/bonding layer 560 and/or BOX barrier layer (e.g. at least thirty nanometers or at least fifty nanometers of SiN) 550 may be used. Such thinner barrier layers 550 and/or 560 may allow some diffusion of Li. However, diffusion of Li may still be retarded or eliminated. In some embodiments, a layer of indium-tin-oxide (ITO) may be provided as a bleed layer. The bleed layer may be on either side (e.g. above or below) the TFLN layer.

Heterogeneous integrated device 500 of FIG. 5A also includes additional Li barrier layers 580 that cover at least the sides of the TFLN layer 540. Barrier layers 580 are analogous to barrier layers 550 and 560, and thus to barrier layers 150, 160, 350, 450, and/or 460. In the embodiment shown, the additional barrier layers 580 cover the sides of TFLN chiplet 530 and the top surface of the SiPh integrated circuit 510. In other embodiments, additional barrier layer 580 may cover only the sides of the TFLN chiplet 530 or a combination of the sides of the TFLN chiplet 530 and a portion of the top surface of SiPh integrated circuit 510 in proximity to TFLN chiplet 510. In some embodiments, different Li barrier layers may be used in proximity to the TFLN layer and far from the TFLN layer. For example, SiN and/or SiOxN may be used on and near TFLN chiplet 530, while TiN and/or TaN (e.g. as little as ten nanometers of ALD deposited TiN) may be used further from waveguide 516. Barrier layers 560 in proximity to waveguide 516 are generally desired to be insulating. Thus, in some embodiments, SiN and/or SiOxN are used for BOX barrier layer 560 and barrier/bonding layer 550. The additional barrier layers 580 might be conductive, insulating, or both (e.g. insulating in some regions and conductive in other regions. The barrier structure in FIG. 5A thus includes the barrier/bonding layer 560, BOX barrier layer 550, and additional barrier layers 580.

FIG. 5B is a perspective view of a heterogeneous integrated electro-optic device 500' including a SiPh integrated circuit 510' and an TFLN chiplet 530'. Heterogeneous integrated device 500' depicted in FIG. 5B is analogous to that shown in FIG. 5A. Thus, heterogeneous integrated electro-optic device 500' includes Si substrate 512, oxide 514, Si waveguide 516', additional oxide 519 as part of SiPh integrated circuit 510'. Heterogeneous integrated electro-optic device 500' also includes TFLN chiplet 530' including TFLN (or other lithium-containing TFEO layer) 540 and barrier layer 560. However, additional Li barrier layers 580' reside only on the sides of the TFLN chiplet 530'. In addition, the optical signal carried by the silicon waveguide is shown.

Thus, heterogeneous integrated TFLN-SiP devices 500 and 500' have been formed. The circuit(s) include TFLN chiplets 510/510' having a Li barrier structure. Because of the use of the Li barrier structure, performance and reliability of the heterogeneous integrated TFLN-SiP device 500 and/or 500' may be improved. In particular, benefits analogous to those described for the photonics devices of FIGS. 1A-1E may be realized. For example, Li contamination in a manufacturing facility due to the TFLN layer '540 and/or 540' may be reduced or eliminated. Further, the stoichiometry of the TFLN layer 540 and/or 540' may be closer to what is desired. Thus, the optical properties of the TFLN layer may be preserved and performance of components of the electro-optic device formed using the TFLN layer may be improved.

Figure 6:
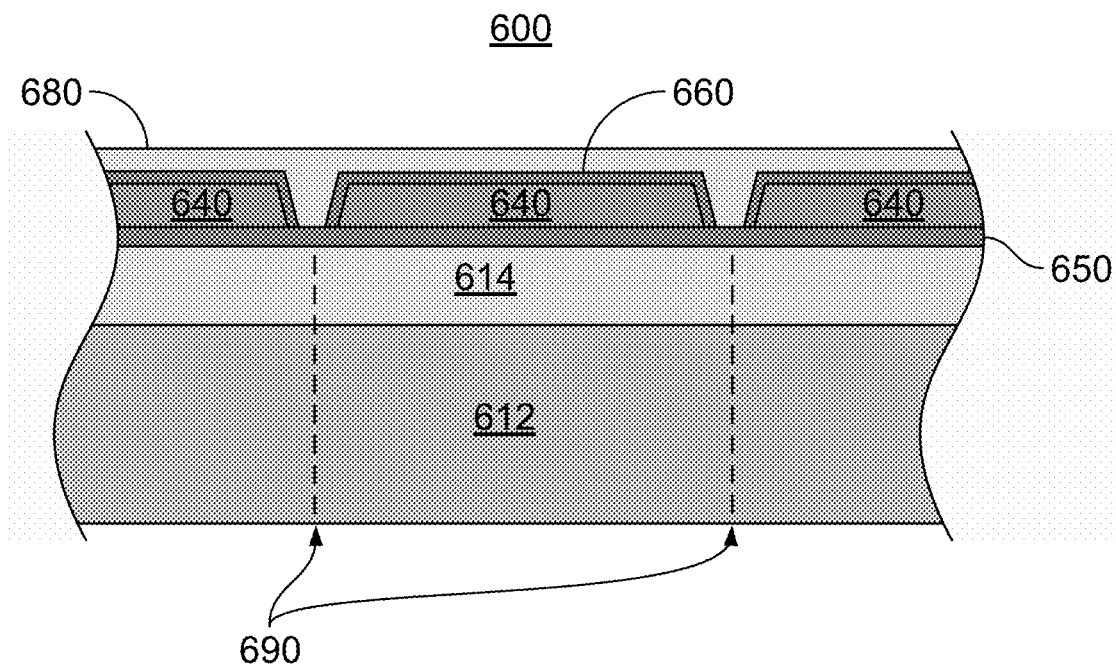
FIG. 6 depicts an embodiment of electro-optic devices that include electro-optic layers having Li.

FIG. 6 depicts an embodiment of system 600 having electro-optic devices that include electro-optic layers 640 containing Li. In the embodiment shown, the electro-optic devices include TFLN layer 640. In other embodiments, another Li-containing electro-optic material such as LT may be used. The electro-optic devices of FIG. 6 include handle wafer 612, BOX layer 614, BOX barrier layer 650, TFLN layer 640, additional barrier layer 660, and oxide layer 680 (e.g. a cladding layer). Handle wafer 612, BOX layer 614, BOX barrier layer 650, TFLN layer 640, and barrier layer 660 may be analogous to handle wafer 402, BOX layer 404, BOX barrier layer 450, LN layer 440, barrier, and bonding layer 460, respectively, described with respect to FIG. 4. BOX barrier layer 650 and barrier layer 660 are each Li barrier layers such as those described herein (e.g. TaN, TiN, SiN, SiOxN of the desired stoichiometry and thickness). In some embodiments, BOX barrier layer 650 and/or barrier and bonding layer 660 are desired to be insulating. For example, barrier layers 650 and 660 of FIG. 6 may be SiN and/or SiOxN. Thus, the barrier structure for the TFLNOI circuit 600 shown in FIG. 6 may include both BOX barrier layer 650 and barrier and bonding layer 660. Further, BOX 614, BOX barrier 650, and TFLN layer 640 may be formed as described with respect to FIG. 4.

In addition, TFLN layer 640 has been patterned prior to deposition of barrier layer 660. In the embodiment shown, TFLN layer 640 may be provided on the BOX barrier layer 650. TFLN layer 640 is etched down to the underlying BOX barrier layer 650 before barrier layer 660 is deposited. The conformal barrier layer 660 is then deposited. Oxide layer 680 may then be deposited. The electro-optic devices may then be singulated. For example, the dicing lanes 690 correspond to the regions where TFLN layer 640 has been etched. As a result, the TFLN electro-optic devices in which TFLN layer 640 has top, bottom, and side surfaces covered by a Li barrier structure formed by barrier layers 650 and 660 ("LN encapsulated chiplets") are formed. These TFLN encapsulated chiplets are analogous to the TFLN chiplets 500 and 500' shown in FIGS. 5A and 5B but also include a Li barrier layer 660 on the sides of the chiplet that is provided prior to integration with another circuit. The TFLN encapsulated chiplets may then be integrated with other circuits. For example, the TFLN encapsulated chiplet may be flip chip bonded to a SiP circuit analogous to those shown in FIGS. 5A and 5B.

Thus, TFLN encapsulated electro-optic devices may be formed. The Li barrier structure including barrier layers 650 and 660 may encapsulate TFLN layer 640. Because of the use of the Li barrier structure, performance and reliability of devices incorporated the TFLN encapsulated chiplets may be improved. For example, Li migration to other structures may be reduced or eliminated. Li contamination in a manufacturing facility due to TFLN layer 640 may be reduced or eliminated. Further, the stoichiometry of TFLN layer 640 may be closer to what is desired. Thus, the optical properties of TFLN layer 640 may be preserved and performance of components of the electro-optic device formed using TFLN layer 640 may be improved.

Figure 7:
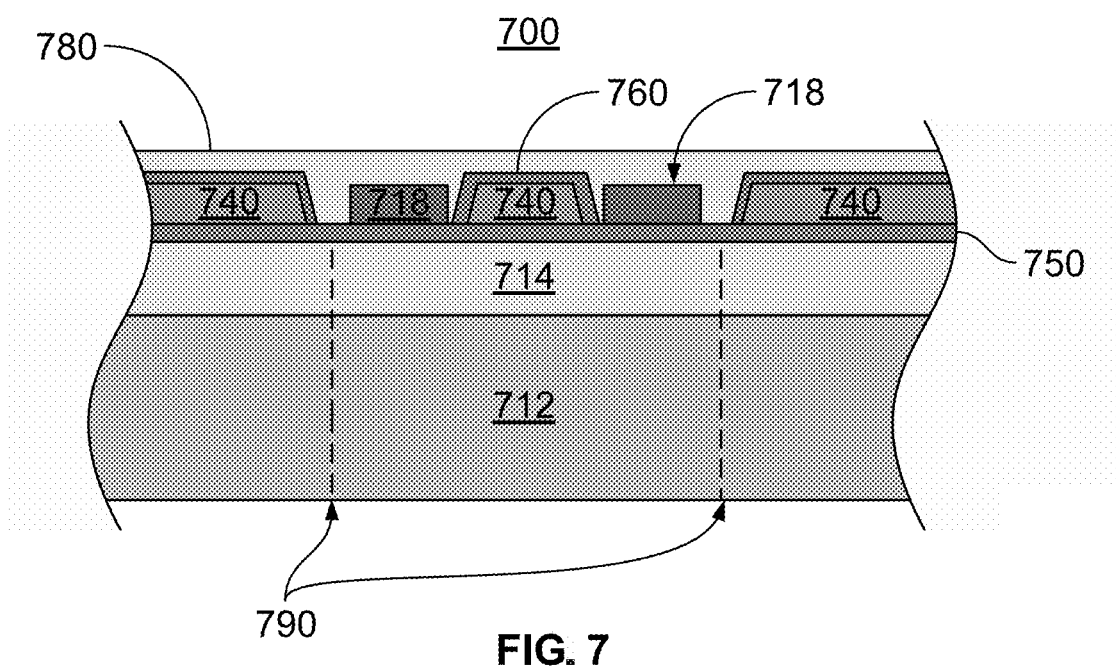
FIG. 7 depicts an embodiment of electro-optic devices that include electro-optic layers having Li.

FIG. 7 depicts an embodiment of system 700 including electro-optic devices that include thin film electro-optic layers 740 having Li. In the embodiment shown, the electro-optic devices include TFLN layer 740. In other embodiments, another Li-containing electro-optic material such as LT may be used. The electro-optic devices of FIG. 7 include handle wafer 712, BOX layer 714, BOX barrier layer 750, TFLN layer 740, additional barrier layer 760, and oxide layer 780 (e.g. a cladding layer). Handle wafer 712, BOX layer 714, BOX barrier layer 750, TFLN layer 740, and barrier layer 760 may be analogous to handle wafer 402 and 612, BOX layer 404 and 612, BOX barrier layer 450 and 750, TFLN layer 440 and 740, and barrier layer 660 and 760 described with respect to FIGS. 4 and 6. BOX barrier layer 750 and barrier layer 760 are each Li barrier layers such as those described herein (e.g. TaN, TiN, SiN, SiOxN of the desired stoichiometry and thickness). In some embodiments, BOX barrier layer 750 and/or barrier and bonding layer 760 are desired to be insulating. Thus, the Li barrier layers of FIG. 7 may be SiN and/or SiOxN. Thus, the barrier structure for the TFLNOI circuits shown in FIG. 7 may include both BOX barrier layer 750 and barrier and bonding layer 760. Further, BOX 714, BOX barrier 750, and TFLN layer 740 may be formed as described with respect to FIGS. 4 and 6.

In addition, TFLN layer 740 has been patterned prior to deposition of barrier layer 760. In the embodiment shown, TFLN layer 740 may be provided on BOX barrier layer 750. TFLN layer 740 is etched down to the underlying BOX barrier layer 714 before barrier layer 760 is deposited. The etching may provide larger spaces between the remaining portions of TFLN layer 740. Conformal Li barrier layer 760 is then deposited. Further, embedded electrodes 718 are also formed. Oxide layer 780 may then be provided. In some embodiments, a borophosphosilicate glass (BPSG) may be used instead of or in addition to the oxide. For example, layers of BPSG and oxide might be used. BPSG may be desired to be used to further retard out-diffusion of Li. The electro-optic devices may then be singulated. For example, the dicing lanes 790 correspond to the regions where the TFLN layer 740 has been etched. As a result, the TFLN electro-optic devices in which TFLN layer 740 has top, bottom, and side surfaces covered by Li barrier structure formed by layers 750 and 760 ("LN encapsulated chiplets") which also have other structures such as electrodes are formed. These TFLN encapsulated chiplets are analogous to the TFLN chiplets shown in FIG. 6 but also include other components. This TFLN encapsulated chiplet may then be integrated with other circuits. For example, the TFLN encapsulated chiplet may be flip chip bonded to a SiP circuit analogous to those shown in FIGS. 5A and 5B.

Thus, TFLN encapsulated electro-optic devices may be formed in systems 600 and 700. Because other components such as electrodes 718 are included, additional functions may be provided. Because of the use of the Li barrier structure, performance and reliability of devices incorporated the TFLN encapsulated chiplets may be improved. For example, Li migration to other structures may be reduced or eliminated. Li contamination in a manufacturing facility due to the TFLN layer 740 may be reduced or eliminated. Further, the stoichiometry of the TFLN layer may be closer to what is desired. In some embodiments, the pattern of the TFLN can be used to manage the holistic properties of the chiplet. For example, TFLN fill outside of the electro-optic regions shown may be used to allow improve the uniformity of the devices being formed. In addition to forming embedded electrodes, metal fill patterns may be used to improve thermal impedance of the devices. Thus, the optical properties of the TFLN layer may be preserved and performance of components of the electro-optic device formed using the TFLN layer may be improved.

Figure 8:
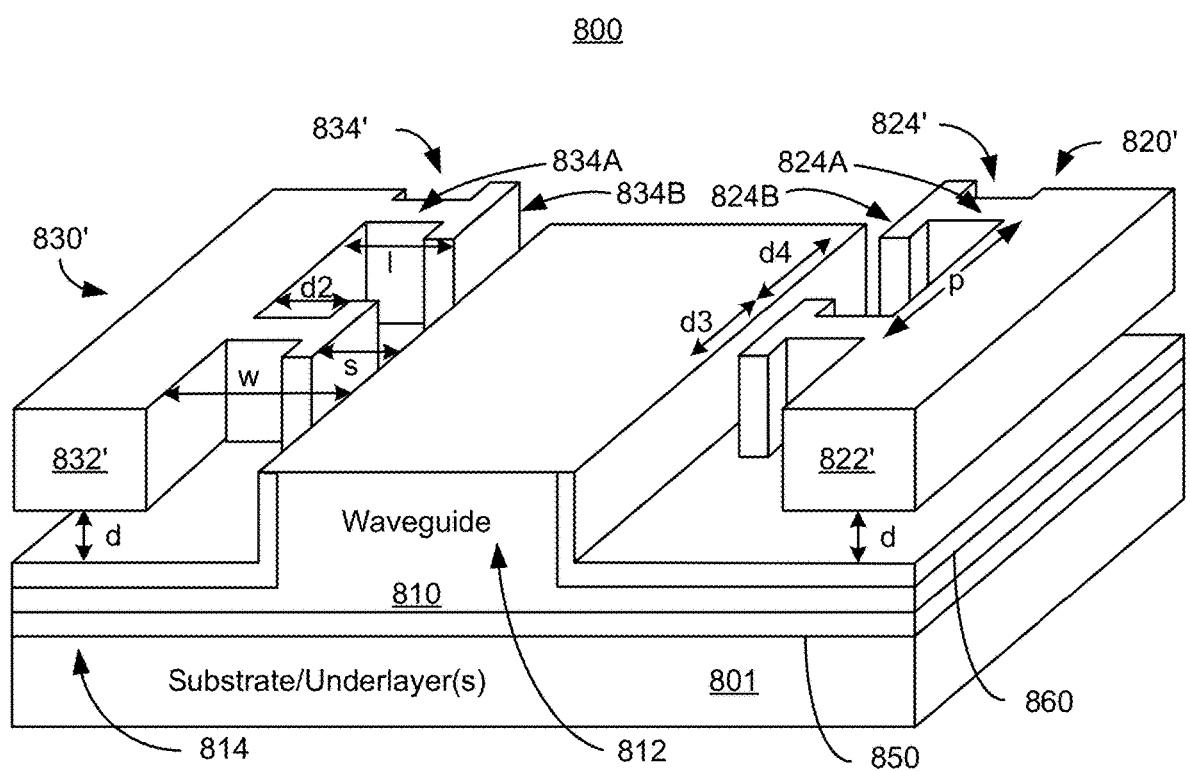
FIG. 8 depicts an embodiment of an electro-optic device incorporating a barrier layer.

FIG. 8 depicts an embodiment of electro-optic device 800 incorporating a barrier structure. For clarity, electro-optic device 800 is not to scale and not all components are shown. For example, a top cladding layer is not shown. Electro-optic (or photonics) device 800 includes a substrate or underlayers 801, lithium-containing electro-optic layer 810 that has been formed into ridge waveguide 812 and slab portion 814, and electrodes 820' and 830'. Electrode 820' includes channel region 822' and extensions 824'. Electrode 830' includes channel region 832' and extensions 834'. Electro-optic device 800 also includes barrier layers 850 and 860 forming a lithium barrier structure. Substrate 801 may include an underlying substrate such as Si and a BOX layer (not separately shown).

Electro-optic layer 810 is a TFEO layer analogous to layer 114, 314, 440, 540, Thus, TFEO layer 810 may include LN and/or LT. In some embodiments, the nonlinear optical material for TFEO layer 810 is formed as a thin film. For example, the thin film may have a thickness (e.g. of thin film or slab portion 814 and ridge waveguide portion 812) of not more than three multiplied by the optical wavelengths for the optical signal carried in ridge waveguide 812 before processing. In some embodiments, the thin film has a thickness (e.g. of thin film portion 814 and ridge waveguide portion 812) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. The thin film nonlinear optical material may be fabricated into waveguide 812 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 812 may thus have improved surface roughness. For example, the sidewall(s) of ridge waveguide 812 may have reduced surface roughness. For example, the short range root mean square surface roughness of a sidewall of the ridge 812 is less than ten nanometers. In some embodiments, this root mean square surface roughness is not more than five nanometers. In some cases, the short range root mean square surface roughness does not exceed two nanometers. Thus, waveguide 812 may have the optical losses in the range described above. In some embodiments, the height of ridge waveguide 812 is selected to provide a confinement of the optical mode such that there is a 10 dB reduction in intensity from the intensity at the center of ridge waveguide 812 at ten micrometers from the center of ridge waveguide 812. For example, the height of ridge waveguide 812 is on the order of a few hundred nanometers in some cases. However, other heights are possible in other embodiments. A portion of waveguide 812 is proximate to electrodes 820' and 830' along the direction of transmission of the optical signal (e.g. from the input of the optical signal through waveguide 812 to the modulated optical signal output). The portion of waveguide 812 proximate to electrodes 820' and 830' may the lengths described above, for example a length greater than two millimeters in some embodiments, and greater than two or more centimeters in some such embodiments. Such lengths are possible at least in part because of the low optical losses per unit length for waveguide 812 described above. Further, the portion of waveguide 812 proximate to electrodes 820' and 830' has an optical mode cross-sectional area that is small, as described above for waveguide 812.

Electrodes 820' and 830' apply electric fields to waveguide 812. Electrode(s) 820' and/or 830' may be fabricated using deposition techniques, such as electroplating, and photolithography to shape the electrode 820' and/or 830'. The resulting electrode 820' and/or 830' may have a lower frequency dependent electrode loss, in the ranges described above with respect to electrodes 820' and 830'. Electrode 820' includes a channel region 822' and extensions 824' (of which only one is labeled in FIG. 8). Electrode 830' includes a channel region 832' and extensions 834' (of which only one is labeled in FIG. 8). In some embodiments, extensions 824' or 834' may be omitted from electrode 820' or electrode 830', respectively. Extensions 824' and 834' are closer to waveguide 812 than channel region 822' and 832', respectively, are. For example, the distance s from extensions 824' and 834' to waveguide ridge 812 is less than the distance w from channels 822' and 832' to waveguide ridge 812. In the embodiment shown in FIG. 8, extensions 824' and 834' are at substantially the same level as channel regions 822' and 832', respectively. In some embodiments, the extensions may protrude above and/or below the channel regions in addition to or in lieu of being at the same level.

Extensions 824' and 834' are in proximity to waveguide 812. For example, extensions 824' and 834' are a vertical distance, d from TFEO layer 810. The vertical distance to TFEO layer 810 may depend upon the cladding (not shown in FIG. 8) used. The distance d is highly customizable in some cases. For example, d may range from zero (or less if electrodes 820' and 830' contact or are embedded in thin film portion 814) to greater than the height of ridge 812. However, d is generally still desired to be sufficiently small that electrodes 820' and 830' can apply the desired electric field to waveguide 812. Extensions 824' and 834' are also a distance, s, from ridge 812. Extensions 824' and 834' are desired to be sufficiently close to TFEO layer 810 (e.g. close to ridge 812) that the desired electric field and index of refraction change can be achieved. However, extensions 824' and 834' are desired to be sufficiently far from TFEO layer 810 (e.g. from ridge 812) that their presence does not result in undue optical losses. Although the distance s is generally agnostic to specific geometry or thickness of waveguide 812, s may be selected to allow for both transverse electric and transverse optical modes that are confined differently in waveguide 812. However, the optical field intensity at extensions 824' and 834' (and more at particularly sections 824B and 834B) is desired to be reduced to limit optical losses due to absorption of the optical field by the conductors in extensions 824' and 834'. Thus, s is sufficiently large that the total optical loss for waveguide 812, including losses due to absorption at extensions 824' and 834', is not more than the ranges described above (e.g. 10 dB or less in some embodiments, 8 dB or less in some embodiments, 4 dB or less in some embodiments). In some embodiments, s is selected so that optical field intensity at extensions 824' and 834' is less than −10 dB of the maximum optical field intensity in waveguide 812. 'In some embodiments, s is chosen such that the optical field intensity at extensions 824' and 834' is less than −40 dB of its maximum value in the waveguide. For example, extensions 824' and/or 834' may be at least two micrometers and not more than 2.5 micrometers from ridge 812 in some embodiments.

In the embodiment shown in FIG. 8, extensions 824' have a connecting portion 824A and a retrograde portion 824B. Retrograde portion 824B is so named because a part of retrograde portion may be antiparallel to the direction of signal transmission through electrode 820'. Similarly, extensions 834' have a connecting portion 834A and a retrograde portion 834B. Thus, extensions 824' and 834' have a "T"-shape. In some embodiments, other shapes are possible. For example, extensions 824' and/or 834' may have an "L"-shape, may omit the retrograde portion, may be rectangular, trapezoidal, parallelogram-shaped, may partially or fully wrap around a portion of waveguide 812, and/or have another shape. Similarly, channel regions 822' and/or 832', which are shown as having a rectangular cross-section, may have another shape. Further, extensions 824' and/or 834' may be different sizes, as indicated by FIG. 8. Although all extensions 824' and 834' are shown as the same distance from ridge 812, some of extensions 824' and/or some of extensions 834' may be different distances from ridge 812. Channel regions 822' and/or 832' may also have a varying size. In some embodiments, extensions 824' and 834', respectively, are desired to have a length, l (e.g. l=w−s), that corresponds to a frequency less than the Bragg frequency of the signal for electrodes 820' and 830', respectively. Thus, the length of extensions 824' and 834' may be desired to be not more than the microwave wavelength of the electrode signal divided by $\pi$ at the highest frequency of operation for electrodes 820' and 830'. In some embodiments, the length of extensions 824' and 834' is desired to be less than the microwave wavelength divided by twelve. For example, if the maximum operation frequency is 300 GHz, which corresponds to a microwave wavelength of 440 micrometers in the substrate, extensions 824' and 834' are desired to be at smaller than approximately 37 micrometers. Individual extensions 824' and/or 834' may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 824' and 834'. Thus, the pitch for extensions 824' and 834' may be desired to be not more than the microwave wavelength of the electrode signal divided by $\pi$ at the highest frequency of operation for electrodes 820' and 830'. In some embodiments, the pitch is desired to be less than the microwave wavelength divided by twelve. In some embodiments, the pitch is desired to be less than the microwave wavelength divided by seventy two, allowing for a low ripple in group velocity.

Extensions 824' and 834' are closer to ridge 812 than channels 822' and 832', respectively, are (e.g. s<w). In some embodiments, a dielectric cladding (not explicitly shown in FIG. 8) resides between electrodes 820' and 830' and waveguide 812. As discussed above, extensions 824' and 834' are desired to have a length (w−s) that corresponds to a frequency less than the Bragg frequency of the signal for electrodes 820' and 830', respectively. Extensions 824' and 834' are also desired to be spaced apart from ridge 812 as indicated above (e.g. such that the absorption loss in waveguide 812 can be maintained at the desired level, such as 10 dB or less). The length of the extensions 824' and 834' and desired separation from ridge 812 (e.g. s) are considered in determining w. Although described in the context of a horizontal distance, the distance between electrode structures and the waveguide also applies for vertical configurations. Other distances between ridge waveguide 812 and channel regions 822' and/or 832' are possible.

Electro-optic device 800 also includes barrier structure formed from barrier layers 850 and 860. Barrier layers 850 and 860 are analogous to barrier layers 750 and 760. Thus, the diffusion of lithium may be mitigated or prevented.

Electro-optic device 800 may share the benefits of electro-optic devices 100, 100', 100", 300, 300', 400, 500, 500', 600, and/or 700. Because of the use of the Li barrier structure, performance and reliability of devices incorporated the TFLN encapsulated chiplets may be improved. Further, the use of extensions 824' and 834' may improve performance. Use of electrodes 820' and 830' having extensions 824' and 834', respectively, may reduce microwave losses, allow for a large electric field at ridge waveguide 812 and improve the propagation of the microwave signal through electrodes 820' and 830', respectively. Consequently, performance of optical device 800 may be significantly enhanced.

Figure 9:
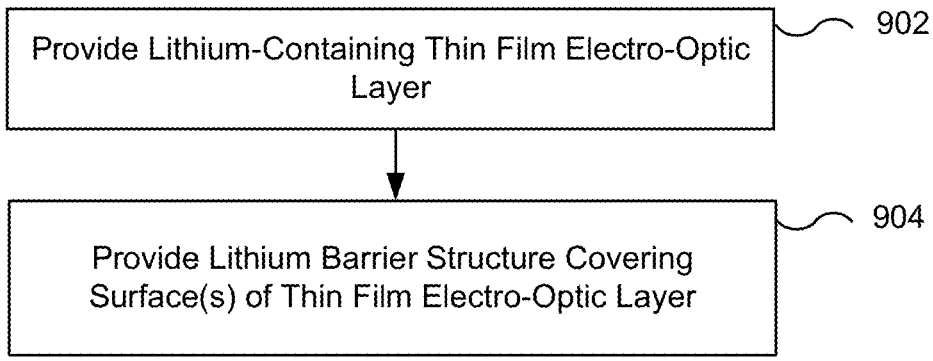
FIG. 9 is a flow chart depicting an embodiment of a method for providing an electro-optic device including a barrier structure.

FIG. 9 is a flow chart depicting an embodiment of method 900 for forming an optical modulator having improved performance. Method 900 is described in the context of processes that may have sub-processes. Although described in a particular order, another order not inconsistent with the description herein may be utilized.

A TFEO layer including lithium is provided, at 902. 902 may include depositing a LN and/or LT layer. In some embodiments, the layer is patterned. For example, dicing lanes and/or a ridge waveguide may be formed. Thus, the TFEO layer provided includes multiple surfaces.

A lithium barrier structure covering at least a portion of the plurality of surfaces is provided, at 904. Providing the lithium barrier structure may include depositing at least one of a silicon nitride layer, a silicon oxynitride layer, a titanium nitride layer, or a tantalum nitride layer of sufficient thickness to reduce or prevent lithium diffusion. In some embodiments, 904 includes depositing or growing multiple barrier layers. A barrier layer may be formed before formation of the TFEO layer at 902. Another barrier layer may be formed after the TFEO layer is formed at 902.

For example, referring to FIG. 6, lithium-containing TFEO layer 640 is formed at 902. Thus, 902 may include forming dicing lanes 690 and/or other structures. Barrier layers 650 and 660 are formed at 904. Barrier layer 650 is formed prior to TFEO layer 630, while barrier layer 660 is formed after TFEO layer 640. Using method 900, a device having improved performance may be formed. In particular, lithium diffusion may be reduced or eliminated.

Figure 10:
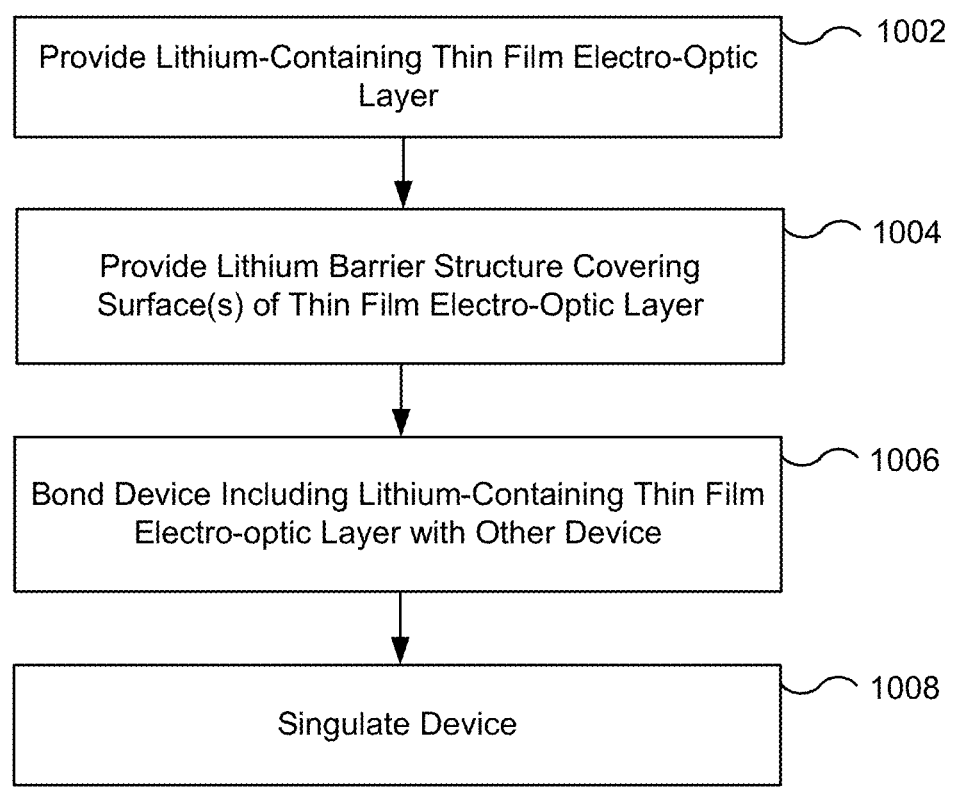
FIG. 10 is a flow chart depicting an embodiment of a method for providing an electro-optic device including a barrier structure.

FIG. 10 is a flow chart depicting an embodiment of method 1000 for forming an optical modulator having improved performance. Method 1000 is described in the context of processes that may have sub-processes. Although described in a particular order, another order not inconsistent with the description herein may be utilized.

A TFEO layer including lithium is provided, at 1002. 1002 may include depositing a LN and/or LT layer. In some embodiments, the layer is patterned. For example, dicing lanes and/or a ridge waveguide may be formed. Thus, the TFEO layer provided includes multiple surfaces. In some embodiments, 1002 is analogous to 902.

A lithium barrier structure covering at least a portion of the plurality of surfaces is provided, at 1004. Providing the lithium barrier structure may include depositing at least one of a silicon nitride layer, a silicon oxynitride layer, a titanium nitride layer, or a tantalum nitride layer of sufficient thickness to reduce or prevent lithium diffusion. In some embodiments, 1004 includes depositing or growing multiple barrier layers. A barrier layer may be formed before formation of the TFEO layer, at 1002. Another barrier layer may be formed after the TFEO layer is formed at 1002. In some embodiments, at 1004 may form the barrier layer on a separate device from the TFEO layer formed at 1002.

The device incorporating the lithium-containing TFEO layer is bonded with another device, at 1006. In some embodiments, 1006 includes bonding one device with the TFEO layer to another device having the barrier layer. Electro-optic devices may be singulated at 1008.

For example, referring to FIGS. 1A-1E, lithium-containing TFEO layer 114 is formed at 1002. Layer 114 is formed on substrate 112. Barrier layer 150 is formed at 1004. Devices 110 and 130 are bonded, at 906. Further processing may be carried out. For example, donor substrate 112 may be removed and additional barrier layer 160 may be fabricated. separate devices 100 may then be singulated. Thus, lithium barrier structures may be fabricated and device performance improved.

Although the foregoing embodiments have been described in some detail for purposes of clarity of understanding, the invention is not limited to the details provided. There are many alternative ways of implementing the invention. For example, various aspects of the devices and methods described may be combined in manners not explicitly described. The disclosed embodiments are illustrative and not restrictive.

What is claimed is:

1. An electro-optic device, comprising:
a thin film electro-optic layer including lithium and including a plurality of patterned structures, each of the plurality of patterned structures having a plurality of surfaces, the plurality of surfaces including a bottom surface, a top surface, and a plurality of sidewalls, the thin film electro-optic layer being on a substrate, the thin film electro-optic layer having a thickness not exceeding three micrometers; and
a lithium barrier structure covering at least a portion of the plurality of surfaces, wherein the lithium barrier structure includes an upper lithium barrier structure, a lower lithium barrier structure, and a sidewall lithium barrier structure, wherein the upper surface of the thin film electro-optic layer is covered by the upper lithium barrier structure, wherein the bottom surface of the thin film electro-optic layer is covered by the lower lithium barrier structure, wherein at least one sidewall of the plurality of sidewalls of the thin film electro-optic layer is covered by the sidewall lithium barrier structure, and wherein the sidewall lithium barrier structure has an L shape.

2. The electro-optic device of claim 1, wherein the lower lithium barrier structure resides between the bottom surface and the substrate.

3. The electro-optic device of claim 1, wherein the thin film electro-optic layer and the lithium barrier structure are part of an integrated circuit, the electro-optic device further comprising:
a photonics device coupled with the integrated circuit.

4. The electro-optic device of claim 3, wherein the integrated circuit is bonded to the photonics device such that at least a portion of the lithium barrier structure is between a portion of the photonics device and the thin film electro-optic layer.

5. The electro-optic device of claim 4,
wherein the sidewall lithium barrier structure covers a plurality of sides of the integrated circuit.

6. The electro-optic device of claim 3, wherein the photonics device includes a silicon photonics device.

7. The electro-optic device of claim 1, further comprising:
an insulating dielectric layer, the thin film electro-optic layer being between the insulating dielectric layer and the lithium barrier structure.

8. The electro-optic device of claim 1, wherein the electro-optic layer is on an oxide layer residing on the substrate, the substrate being a silicon substrate; and
wherein at least a portion of the lithium barrier structure is between the electro-optic layer and the oxide layer.

9. The electro-optic device of claim 1, wherein the thin film electro-optic layer includes lithium provided into the top surface of the thin film electro-optic layer before the lithium barrier structure is provided.

10. The electro-optic device of claim 1, wherein a silicon dioxide BOX layer is sandwiched between the lithium barrier structure and the substrate.

11. The electro-optic device of claim 1, wherein a silicon dioxide BOX layer is sandwiched between the thin film electro-optic layer and the lithium barrier structure and the other substrate.

12. The electro-optic device of claim 1, wherein the lithium barrier structure includes at least one of a titanium nitride layer or a tantalum nitride layer.

13. An electro-optic device, comprising:
a waveguide including a thin film electro-optic layer, the thin film electro-optic layer including lithium and including a plurality of patterned structures, each of the plurality of patterned structures having a plurality of surfaces, the plurality of surfaces including a bottom surface, a top surface, and a plurality of sidewalls, the waveguide including an upper waveguide structure, a lower waveguide structure, and a sidewall waveguide structure, the waveguide being on a substrate, the thin film electro-optic layer having a thickness not exceeding three micrometers;
a lithium barrier structure covering at least a portion of the plurality of surfaces, wherein the lithium barrier structure includes an upper lithium barrier structure, a lower lithium barrier structure, and a sidewall lithium barrier structure, and
a plurality of electrodes in proximity to a portion of the waveguide, wherein the upper surface of the waveguide is covered by the upper lithium barrier structure, wherein the bottom surface of the thin film electro-optic layer is covered by the lower lithium barrier structure, wherein at least one sidewall of the plurality of sidewalls of the waveguide is covered by the sidewall lithium barrier structure, and wherein the sidewall lithium barrier structure has an L shape.

14. The electro-optic device of claim 13, further comprising:
a silicon photonics device including a silicon waveguide optically coupled with the waveguide.

15. A method, comprising:
providing a thin film electro-optic layer including lithium, the thin film electro-optic layer having a thickness not exceeding three micrometers, the providing the thin film electro-optic layer further including
providing a plurality of patterned structures having a plurality of surfaces,
providing a lithium barrier structure covering at least a portion of the plurality of surfaces, the plurality of surfaces including a bottom surface, a top surface, and a plurality of sidewalls, wherein the lithium barrier structure includes an upper lithium barrier structure, a lower lithium barrier structure, and a sidewall lithium barrier structure,
wherein the thin film electro-optic layer and the lithium barrier structure are on a substrate, wherein the upper surface of the thin film electro-optic layer is covered by the upper lithium barrier structure, wherein the bottom surface of the thin film electro-optic layer is covered by the lower lithium barrier structure, wherein at least one sidewall of the plurality of sidewalls of the thin film electro-optic layer is covered by the sidewall lithium barrier structure, and wherein the sidewall lithium barrier structure has an L shape.

16. The method of claim 15, wherein the providing the thin film electro-optic layer further includes:
providing an electro-optic layer; and wherein the providing the plurality of patterned structures further includes
patterning the electro-optic layer via photolithography to provide the plurality of patterned structures such that at least one of the plurality of sidewalls has a surface roughness of less than ten nanometers.

17. The method of claim 16, wherein the providing the lithium barrier structure further includes:
depositing a first lithium barrier layer before the thin film electro-optic layer is provided; and
depositing a second lithium barrier layer after the plurality of patterned structures is provided, the second lithium barrier layer covering the top surface, and the plurality of sidewalls of each of the plurality of patterned structures, a portion of the first lithium barrier layer being adjacent to the bottom surface of each of the plurality of patterned structures.

18. The method of claim 15, wherein the thin film electro-optic layer and the lithium barrier structure are part of an integrated circuit, the method further comprising:
bonding the integrated circuit to a photonics device such that at least a portion of the lithium barrier structure is between the thin film electro-optic layer and the photonics device.

19. The method of claim 18, wherein the photonics device is one of a plurality of photonics devices integrated into a wafer and the integrated circuit is one of a plurality of integrated circuits, each of the plurality of integrated circuits including the thin film electro-optic layer and the lithium barrier structure, the bonding further includes:
bonding remaining integrated circuits of the plurality of integrated circuits to remaining photonics devices of the plurality of photonics devices; and
singulating a plurality of heterogeneous integrated circuits, each of the plurality of heterogeneous integrated circuits including a particular photonics device of the plurality photonics devices and a particular integrated circuit of the plurality of integrated circuits.

20. The method of claim 17, wherein the photonics device includes a silicon photonics device.

21. The method of claim 15, wherein providing the thin film electro-optic layer further includes:
providing the thin film electro-optic layer on an insulating dielectric layer, the thin film electro-optic layer being between the insulating dielectric layer and the lithium barrier structure.

22. The method of claim 15, wherein the providing electro-optic layer further includes:
providing lithium into the top surface of the thin-film electro-optic layer before the lithium barrier structure is provided.

* * * * *